US012761659B2

(12) United States Patent
Li et al.

(10) Patent No.: US 12,761,659 B2
(45) Date of Patent: Oct. 13, 2026

(54) METHOD AND SYSTEM FOR NAVIGATING A ROBOT IN A DESIGNATED ENVIRONMENT

(71) Applicant: Agency for Science, Technology and Research, Singapore (SG)

(72) Inventors: Jun Li, Singapore (SG); Zhengguo Li, Singapore (SG); Kong Wah Wan, Singapore (SG); Chee Leong Raymond Chan, Singapore (SG); Wei Yun Yau, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 19 days.

(21) Appl. No.: 18/852,003

(22) PCT Filed: Mar. 24, 2023

(86) PCT No.: PCT/SG2023/050197
§ 371 (c)(1),
(2) Date: Sep. 27, 2024

(87) PCT Pub. No.: WO2023/191715
PCT Pub. Date: Oct. 5, 2023

(65) Prior Publication Data

US 2025/0216856 A1 Jul. 3, 2025

(30) Foreign Application Priority Data

Mar. 30, 2022 (SG) ............................ 10202203235T

(51) Int. Cl.
*G05D 1/246* (2024.01)
*G05D 1/646* (2024.01)
(Continued)

(52) U.S. Cl.
CPC ........... *G05D 1/2469* (2024.01); *G05D 1/646* (2024.01); *G05D 2107/60* (2024.01); *G05D 2109/10* (2024.01); *G05D 2111/10* (2024.01)

(58) Field of Classification Search
CPC .. G05D 1/2469; G05D 1/646; G05D 2107/60; G05D 2109/10; G05D 2111/10
(Continued)

(56) References Cited

U.S. PATENT DOCUMENTS 9,081,079 B2 * 7/2015 Chao .................. G01S 5/02522
9,452,530 B2 * 9/2016 Sisbot .................... G06V 40/25
(Continued)

FOREIGN PATENT DOCUMENTS

CN 104807462 7/2015

OTHER PUBLICATIONS

The International Search Report (ISR) with Written Opinion for PCT/SG2023/050197 dated Aug. 28, 2023, pp. 1-9.
(Continued)

*Primary Examiner* — Luis A Martinez Borrero
(74) *Attorney, Agent, or Firm* — McDonnell Boehnen Hulbert & Berghoff LLP

(57) ABSTRACT

A method and system for navigating a robot 100 in a designated environment are provided herein. In an embodiment, the method comprises: selectively identifying reference features from a scale plan of the designated environment; generating a topometric map 178 of the designated environment, the topometric map 178 being associated with the identified reference features; generating an initial navigation path 176 of a local region 174 from the topometric map 178; as the robot 100 navigates along the initial navigation path 176 of the local region 174, detecting onsite reference features of the local region 174 that correspond to the identified reference features of the scale plan; and
(Continued)

updating the topometric map 178 based on the correspondence to generate a regional path plan 188 to guide the robot's direction in the local region 174.

18 Claims, 10 Drawing Sheets

(51) Int. Cl.
*G05D 107/60* (2024.01)
*G05D 109/10* (2024.01)
*G05D 111/10* (2024.01)

(58) Field of Classification Search
USPC ........................................................ 701/25
See application file for complete search history.

(56) References Cited

U.S. PATENT DOCUMENTS

| | | | | |
|---|---|---|---|---|
| 9,594,377 | B1 * | 3/2017 | Perkins | B25J 9/1664 |
| 9,612,123 | B1 * | 4/2017 | Levinson | B60Q 1/508 |
| 10,612,934 | B2 * | 4/2020 | Tan | G01C 21/3453 |
| 11,232,391 | B1 * | 1/2022 | Baalke | G01C 21/3688 |
| 11,372,409 | B2 * | 6/2022 | Freitas | B62D 57/032 |
| 2013/0295952 | A1 * | 11/2013 | Chao | G01S 5/0236 455/456.1 |
| 2016/0114488 | A1 * | 4/2016 | Mascorro Medina | B25J 9/1697 901/1 |
| 2017/0123421 | A1 * | 5/2017 | Kentley | G01C 21/3415 |
| 2019/0219409 | A1 * | 7/2019 | Tan | G01C 21/3453 |
| 2019/0377346 | A1 * | 12/2019 | Freitas | B62D 57/028 |
| 2020/0047340 | A1 * | 2/2020 | Hong | G01S 17/894 |
| 2020/0050995 | A1 * | 2/2020 | Ramanand | G06Q 10/06395 |
| 2021/0281977 | A1 * | 9/2021 | Ebner | H04W 4/33 |
| 2024/0028031 | A1 * | 1/2024 | Kentley-Klay | G01C 21/3415 |

OTHER PUBLICATIONS

Li, J. et al. "Cognitive Navigation for Indoor Environment Using Floorplan" IEEE/RSJ International Conference on Intelligent Robots and Systems (IROS) 2021, pp. 9030-9037. [Retrieved on Aug. 22, 2023] <DOI: 10.1109/IROS51168.2021.9635850>.
Boniardi, F. et al. "Robust LiDAR-based Localization in Architectural Floor Plans" IEEE/RSJ International Conference on Intelligent Robots and Systems (IROS) 2017, pp. 1-7. [Retrieved on Aug. 22, 2023] <DOI: 10.1109/IROS.2017.8206168>.
Lam, Obadiah et al. "Automated Topometric Graph Generation from Floor Plan Analysis" Proceedings of the Australasian Conference on Robotics and Automation (2015), pp. 1-8. [Retrieved on Aug. 22, 2023].

* cited by examiner

METHOD AND SYSTEM FOR NAVIGATING A ROBOT IN A DESIGNATED ENVIRONMENT

This application is a U.S. national phase of International Application No. PCT/SG2023/050197, filed on Mar. 24, 2023, which claims priority to Singapore patent application Ser. No. 10/202,203235T, filed Mar. 30, 2022, both of which are incorporated by reference herein in their entirety.

FIELD

The invention relates to a method and system for navigating a robot in a designated environment.

BACKGROUND

For navigation in an environment, a robot normally relies on precise measurement everywhere to perform the navigation because of the nature of measuring instruments. Metric map-based robot navigation needs pre-mapping of the environment to build a detailed prior map. This is not trivial, especially when the environment changes frequently. Sometimes it is difficult to obtain a globally consistent map with the increasing scales of the space. It may also require large storage space and heavy computation power to apply such a map. If the measurement fails due to the big local environment change, accumulated errors from measurement are big enough, or in an extreme case there is no way to measure the environment from a certain sensor, the robot would have troubles in navigation.

It is an object of the present invention to address problems of the prior art and/or to provide the public with a useful choice.

SUMMARY

According to a first aspect of the present invention, there is provided a method of navigating a robot in a designated environment, the method comprises: selectively identifying reference features from a scale plan of the designated environment; generating a topometric map of the designated environment, the topometric map being associated with the identified reference features; generating an initial navigation path of a local region from the topometric map; as the robot navigates along the initial navigation path of the local region, detecting on-site reference features of the local region that correspond to the identified reference features of the scale plan; and updating the topometric map based on the correspondence to generate a regional path plan to guide the robot's direction in the local region.

By starting the navigation based on the scale plan, efficiency in deployment and navigation of the robot in the designated environment may be improved. By bridging the high-level topological map based path planning and low-level local map of on-site detection of the real environment, the regional path plan may lower the requirement of precise localization on the global topometric map and hence lower the requirement on computational resource. Further, due to the correspondence in the scale plan and the actual environment, accumulated errors may be reduced or eliminated before reaching a remarkable level.

It is envisaged that, the topometric map may comprise a plurality of local regions, and in an embodiment, the initial navigation path is generated for each of the plurality of local regions.

In an embodiment, the reference features may comprise a plurality of free spaces identified from the scale plan that are potentially available for the robot to traverse in the designated environment. Preferably, generating the topometric map of the designated environment may comprise generating a topological map by using the plurality of identified free spaces to find a path between any neighbouring two of the plurality of local regions. More preferably, generating the topometric map may further comprise generating a potential navigation path by associating the topological map to the identified reference features. By identifying free spaces from the scale plan, the topological map may be generated based on the identified free space at a lower computational cost, and be reliable in providing a potential navigation path to initiate the navigation without precise localization information.

In an embodiment, at the path between neighbouring two regions of the plurality of local regions, navigating the robot may be based on the generated topological map or the generated potential navigation path. As the path provides a direction guide, the robot may not require detecting on-site reference feature at the path, the requirement of precise localization everywhere may therefore be avoided.

In an embodiment, the method may further comprise detecting on-site reference features of each of the plurality of local regions that correspond to the identified reference features of the scale plan as the robot navigates along the initial navigation path of the corresponding local region. Preferably, the method may further comprise updating the topometric map for each of the plurality of local regions. By updating the topometric map for each local region while the robot is traversing, the topometric map may be enriched with metric information gradually. The metric information for the plurality of local regions may be used to correct the pose of the robot. When the robot is traversing in the environment, it would travel from one local region to another so that the pose of the robot may be corrected periodically which may assist in reducing the strict requirement of the precise positioning.

It is envisaged that the designated environment may be an indoor environment of a building and the scale plan may be a floor plan of the building.

In an embodiment, the reference features may comprise a plurality of junctions identified from the floor plan, and the method may further comprise segmenting the floor plan into a plurality of regions based on the plurality of identified junctions. The structure of the junctions may be used to determine the robot's relative position to its local coordinate system, segmenting the floor plan based on junctions serving as key locations, may help to reduce potential drift of pose of the robot.

In an embodiment, the reference features may further comprise categories of the plurality of segmented regions, and the method may further comprise determining the categories of the plurality of segmented regions by identifying a plurality of structures of the building from the floor plan. By determining categories of the plurality of segmented regions (such as workspace, room, corridor and junction), it may provide a useful source of semantic information, which may be used to provide guidance in the navigation.

In an embodiment, the reference features may comprise locations and directions of a plurality of doors identified from the floor plan. By identifying locations and directions of doors, it may provide reliable guidance for navigating the robot.

According to a second aspect of the present invention, there is provided a system for navigating a robot in a designated environment, the system comprises a sensor module configured to detect on-site reference features, and a processor; the processor is configured to: selectively identify reference features from a scale plan of the designated environment; generate a topometric map of the designated environment, the topometric map being associated with the identified reference features; generate an initial navigation path of a local region from the topometric map; receive on-site reference features of the local region that correspond to the identified reference features of the scale plan from the sensor module as the robot navigates along the initial navigation path of the local region; and update the topometric map based on the correspondence to generate a regional path plan to guide the robot's direction in the local region.

The method used by the system may initiate navigating the robot based on the scale plan, and when the robot is traversing, the sensor module may detect on-site reference features as and when required and/or necessary to assist in navigating the robot, this may help to improve efficiency in deployment of the robot in the designated environment and still meet the accuracy of navigating the robot. Specifically, by bridging the high-level topological map based path planning and low-level local map of on-site detection of the real environment, the regional path plan may lower the requirement of precise localization on the global topometric map and hence lower the requirement on computational resource. Further, due to the correspondence in the scale plan and the actual environment, accumulated errors may be reduced or eliminated before reaching a remarkable level.

It is envisaged that the topometric map may comprise a plurality of local regions, and in an embodiment, the processor may be configured to generate the initial navigation path of each of the plurality of local regions.

In an embodiment, the reference features may comprise a plurality of free spaces identified from the scale plan that are potentially available for the robot to traverse in the designated environment. Preferably, the processor may be further configured to generate a topological map by using the plurality of identified free spaces to find a path between any neighbouring two of the plurality of local regions in order to generate the topometric map of the designated environment. More preferably, the processor may be further configured to generate a potential navigation path by associating the topological map to the identified reference features in order to generate the topometric map of the designated environment. By identifying free spaces from the scale plan, the system may generate the topological map based on the identified free space at a lower computational cost, and in the meantime ensure reliability of the topological map in providing a potential navigation path to initiate the navigation without precise localization information.

In an embodiment, at the path between the neighbouring two regions of the plurality of local regions, the processor may be further configured to navigate the robot based on the generated topological map or the generated potential navigation path. By navigating the robot based on the path which originates from the scale plan, the system may navigate the robot without detecting on-site reference feature at the path so that requirement to the system is reduced, particularly precise localization may not be required everywhere.

In an embodiment, the sensor module may be configured to detect on-site reference features of each of the plurality of local regions that correspond to the identified reference features of the scale plan as the robot navigates along the initial navigation path of the corresponding local region. Preferably, the processor may be configured to update the topometric map for each of the plurality of local regions. By updating the topometric map for each local region, the topometric map generated and updated by the system may become richer and richer in metric information while the robot is navigating. The metric information may be used to correct pose of the robot when the robot reaches a local region where the metric information is available. Therefore, from one local region to another, the pose of the robot may be corrected periodically, which reduces the strict requirement of the precise positioning.

It is envisaged that the designated environment may be an indoor environment of a building and the scale plan may be a floor plan of the building.

In an embodiment, the reference features may comprise a plurality of junctions identified from the floor plan, and the processor is further configured to segment the floor plan into a plurality of regions based on the plurality of identified junctions. The structure of the junctions may be used to determine the robot's relative position to its local coordinate system, by segmenting the floor plan based on junctions serving as key locations, the system may reduce potential drift of pose of the robot effectively.

In an embodiment, the reference features may further comprise categories of the plurality of segmented regions, and the processor is further configured to identify a plurality of structures of the building from the floor plan to determine the categories of the plurality of segmented regions. The categories of the plurality of segmented regions (such as workspace, room, corridor and junction) may be a source of useful semantic information, which the system may rely on in providing guidance in navigating the robot.

In an embodiment, the reference features may comprise locations and directions of a plurality of doors identified from the floor plan. These contribute relatively reliable orientation guided landmarks for the system to rely on in navigating the robot.

According to a third aspect of the present invention, there is provided a robot. The robot comprises a system, and a controller configured to control an operation of the robot in a designated environment based on a direction provided by the system; the system comprises a sensor module configured to detect on-site reference features, and a processor; the processor is configured to: selectively identify reference features from a scale plan of the designated environment; generate a topometric map of the designated environment, the topometric map being associated with the identified reference features; generate an initial navigation path of a local region from the topometric map; receive on-site reference features of the local region that correspond to the identified reference features of the scale plan from the sensor module as the robot navigates along the initial navigation path of the local region; and update the topometric map based on the correspondence to generate a regional path plan to guide the robot's direction in the local region.

According to a fourth aspect of the present invention, there is provided a non-transitory computer-readable storage medium for storing a computer program, when executed by a processor, performs a method of navigating a robot in a designated environment, the method comprises: selectively identifying reference features from a scale plan of the designated environment; generating a topometric map of the designated environment, the topometric map being associated with the identified reference features; generating an initial navigation path of a local region from the topometric map; as the robot navigates along the initial navigation path of the local region, detecting on-site reference features of the local region that correspond to the identified reference features of the scale plan; and updating the topometric map based on the correspondence to generate a regional path plan to guide the robot's direction in the local region.

BRIEF DESCRIPTION OF THE DRAWINGS

In the following, an embodiment of the present invention including the figures will be described as non-limiting examples with reference to the accompanying drawings in which.

DETAILED DESCRIPTION

According to an embodiment of the present invention, a method of navigating a robot in a designated environment and a system for performing the method are provided. As will be described in detail below, the system navigates the robot starting from a scale plan. Reference features are obtained from the scale plan for generating a topometric map to provide an initial navigation path of a local region based on which the robot may start navigating. Once the robot enters the local region, on-site reference features of the local region are detected, which are then used to update the topometric map to generate a regional path plan to guide the robot's direction in the local region.

Figure 1:
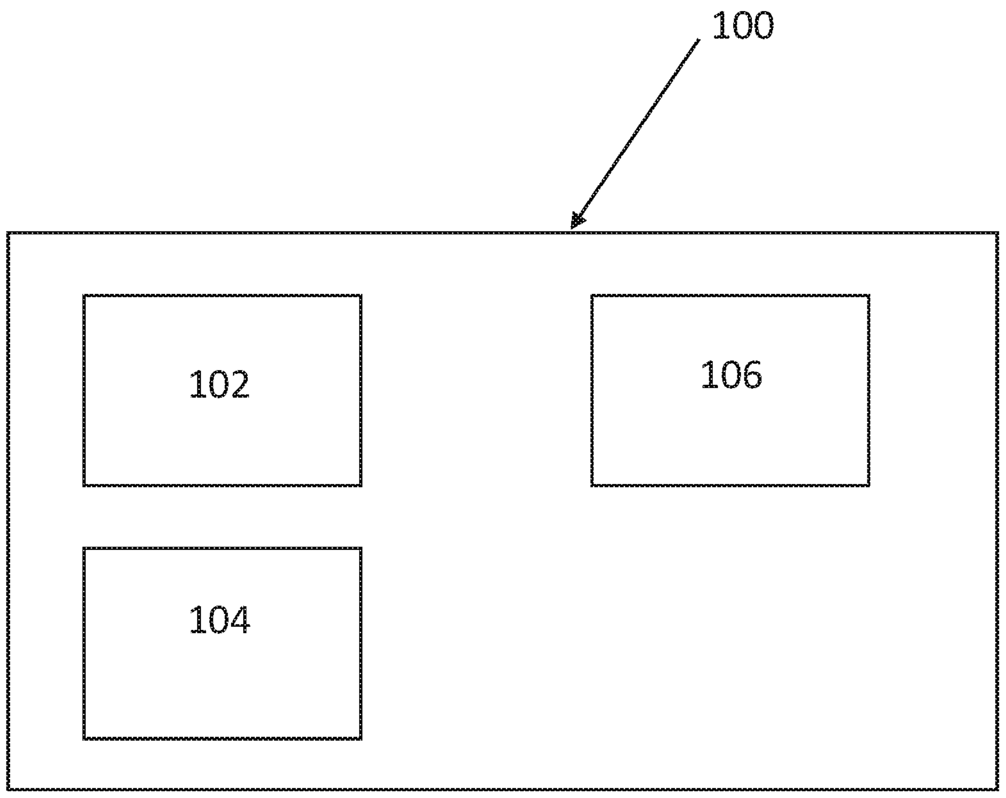
FIG. 1 is a simplified functional block diagram of a robot according to an embodiment of the present invention comprising a navigation system.

FIG. 1 depicts a simplified functional block diagram of the robot 100 according to the described embodiment. The robot 100 includes a sensor module 102 comprising at least a sensor for detecting information of an environment where the robot 100 locates, a navigation system 104 configured to provide information for navigating the robot 100, and a controller 106 configured to control an operation of the robot 100 taking into account of the information provided by the navigation system 104.

The controller 106 may comprise computing devices and a plurality of sub-systems (not shown) for controlling specific aspects of movement of the robot 100 including but not limited to a deceleration system, an acceleration system and a steering system. Certain of these sub-systems may comprise one or more actuators, for example the deceleration system may comprise brakes, the acceleration system may comprise an accelerator pedal, and the steering system may comprise a steering wheel or other actuator to control the angle of turn of wheels of the robot 100, etc.

Figure 2:
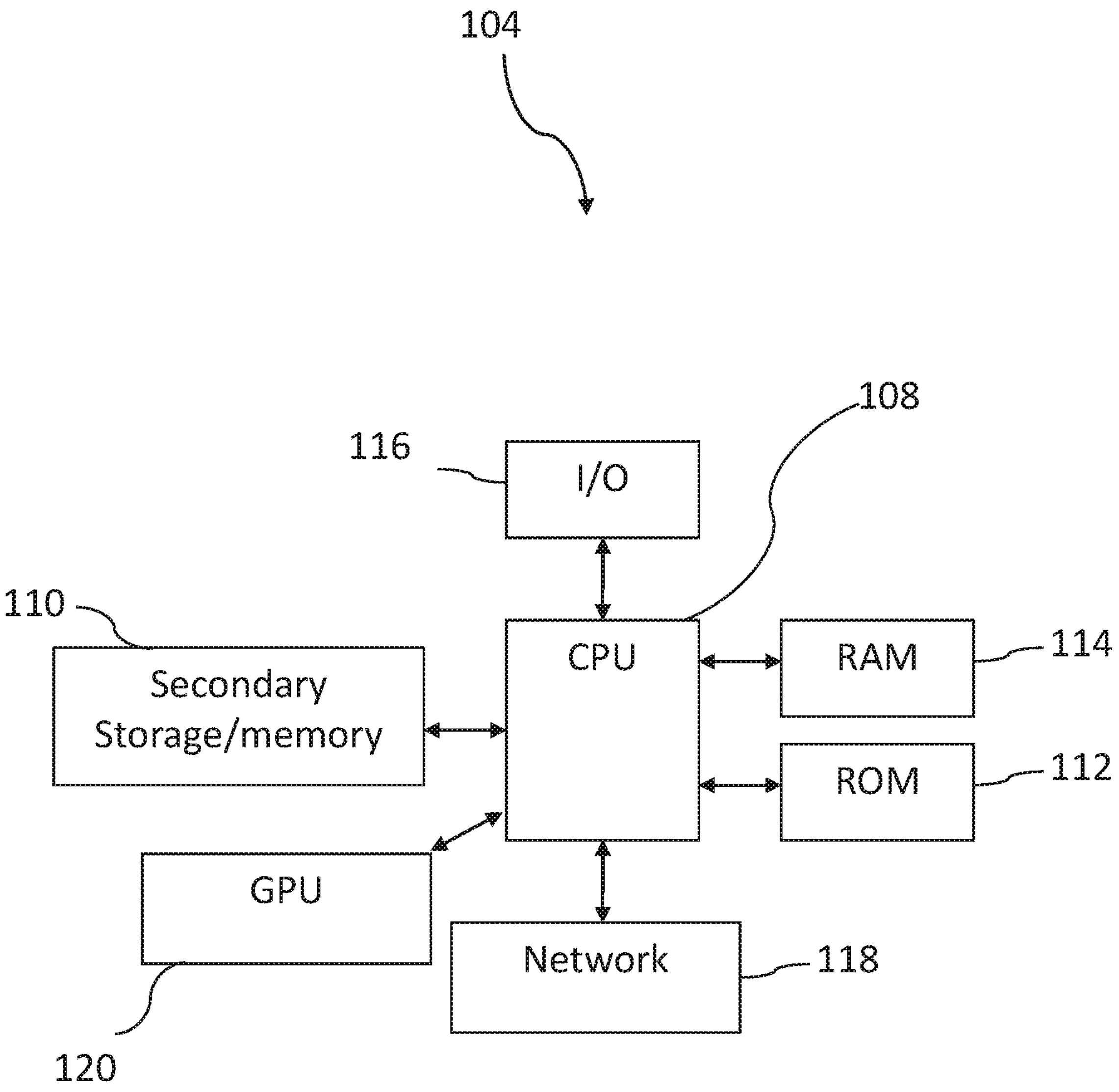
FIG. 2 illustrates a block diagram of the navigation system of FIG. 1.

FIG. 2 illustrates the block diagram of the navigation system 104. The navigation system 104 includes a processor 108 (which may be referred to as a central processor unit or CPU) that is in communication with memory devices including a secondary storage 110, a read only memory (ROM) 112, a random access memory (RAM) 114, an input/output (I/O) devices 116, a network connectivity devices 118 and a graphics processing unit (GPU) 120, for example a mini GPU. The processor 108 and/or GPU 120 may be implemented as one or more CPU chips. The GPU 120 may be embedded alongside the processor 108 or it may be a discrete unit, as shown in FIG. 2.

It is understood that by programming and/or loading executable instructions onto the navigation system 104, at least one of the CPU 108, the RAM 114, the ROM 112 and the GPU 120 are changed, transforming the navigation system 104 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the navigation system 104 is turned on or booted, the CPU 108 and/or GPU 120 may execute a computer program or application. For example, the CPU 108 and/or GPU 120 may execute software or firmware stored in the ROM 112 or stored in the RAM 114. In some cases, on boot and/or when the application is initiated, the CPU 108 and/or GPU 120 may copy the application or portions of the application from the secondary storage 110 to the RAM 114 or to memory space within the CPU 108 and/or GPU 120 itself, and the CPU 108 and/or GPU 120 may then execute instructions that the application is comprised of. In some cases, the CPU 108 and/or GPU 120 may copy the application or portions of the application from memory accessed via the network connectivity devices 118 or via the I/O devices 116 to the RAM 114 or to memory space within the CPU 108 and/or GPU 120, and the CPU 108 and/or GPU 120 may then execute instructions that the application is comprised of. During execution, an application may load instructions into the CPU 108 and/or GPU 120, for example load some of the instructions of the application into a cache of the CPU 108 and/or GPU 120. In some contexts, an application that is executed may be said to configure the CPU 108 and/or GPU 120 to do something, e.g., to configure the CPU 108 and/or GPU 120 to perform the navigation according to the described embodiment. When the CPU 108 and/or GPU 120 is configured in this way by the application, the CPU 108 and/or GPU 120 becomes a specific purpose computer or a specific purpose machine.

The secondary storage 110 may comprise one or more disk drives or tape drives and is used for non-volatile storage of data and as an over-flow data storage device if the RAM 114 is not large enough to hold all working data. The secondary storage 110 may be used to store programs which are loaded into the RAM 114 when such programs are selected for execution. The ROM 112 is used to store instructions and perhaps data which are read during program execution. The ROM 112 is a non-volatile memory device which typically has a small memory capacity relative to the larger memory capacity of the secondary storage 110. The RAM 114 is used to store volatile data and perhaps to store instructions. Access to both the ROM 112 and the RAM 114 is typically faster than to the secondary storage 110. The secondary storage 110, the RAM 114, and/or the ROM 112 may be referred to in some contexts as computer readable storage media and/or non-transitory computer readable media.

The I/O devices 116 may include a wireless or wired connection to the sensor module 102 for receiving data from the sensor module 102 and/or a wireless or wired connection to the controller 106 for transmitting information, such as a path plan, so that the controller 106 may control operation of the robot 100 accordingly. The I/O devices 116 may alternatively or additionally include electronic displays such as video monitors, liquid crystal displays (LCDs), plasma displays, touch screen displays, or other well-known output devices.

The network connectivity devices 118 may enable a wireless connection to facilitate communication with other computing devices such as components of the robot 100, for example the sensor module 102 and/or controller 106 or with other computing devices not part of the robot 100. The network connectivity devices 118 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. The network connectivity devices 118 may enable the processor 108 and/or GPU 120 to communicate with the Internet or one or more intranets. With such a network connection, it is contemplated that the processor 108 and/or GPU 120 might receive information from the network, or might output information to the network in the course of performing a navigation method according to the described embodiment. Such information, which is often represented as a sequence of instructions to be executed using the processor 108 and/or GPU 120, may be received from and outputted to the network, for example, in the form of a computer data signal embodied in a carrier wave.

Such information, which may include data or instructions to be executed using the processor 108 and/or GPU 120 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 108 and/or GPU 120 executes instructions, codes, computer programs, scripts which it accesses from hard disk, floppy disk, optical disk (these various disk-based systems may all be considered the secondary storage 110), flash drive, the ROM 112, the RAM 114, or the network connectivity devices 118. While only one processor 108 and GPU 120 are shown, multiple processors may be present. Thus, while instructions may be discussed as executed by one processor 108, the instructions may be executed simultaneously, serially, or otherwise executed by one or multiple processors. Instructions, codes, computer programs, scripts, and/or data that may be accessed from the secondary storage 110, for example, hard drives, floppy disks, optical disks, and/or other device, the ROM 112, and/or the RAM 114 may be referred to in some contexts as non-transitory instructions and/or non-transitory information.

In an embodiment, the navigation system 104 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the navigation system 104 to provide the functionality of a number of servers that is not directly bound to the number of computers in the navigation system 104. For example, virtualization software may provide twenty virtual servers on four physical computers. In an embodiment, the functionality according to the described embodiment may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality of the described embodiment may be provided as a computer program product. The computer program product may comprise one or more computer readable storage medium having computer usable program code embodied therein to implement the functionality according to the described embodiment. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analogue magnetic tape, compact disk read only memory (CD-ROM) disks, floppy disks, jump drives, digital cards, multimedia cards, and others. The computer program product may be suitable for loading, by the navigation system 104, at least portions of the contents of the computer program product to the secondary storage 110, to the ROM 112, to the RAM 114, and/or to other non-volatile memory and volatile memory of the navigation system 104. The processor 108 and/or GPU 120 may process the executable instructions and/or data structures in part by directly accessing the computer program product, for example by reading from a CD-ROM disk inserted into a disk drive peripheral of the navigation system 104. Alternatively, the processor 108 and/or GPU 120 may process the executable instructions and/or data structures by remotely accessing the computer program product, for example by downloading the executable instructions and/or data structures from a remote server through the network connectivity devices 118. The computer program product may comprise instructions that promote the loading and/or copying of data, data structures, files, and/or executable instructions to the secondary storage 110, to the ROM 112, to the RAM 114, and/or to other non-volatile memory and volatile memory of the navigation system 104.

In some contexts, the secondary storage 110, the ROM 112, and the RAM 114 may be referred to as a non-transitory computer readable medium or a computer readable storage media. A dynamic RAM embodiment of the RAM 114, likewise, may be referred to as a non-transitory computer readable medium in that while the dynamic RAM receives electrical power and is operated in accordance with its design, for example during a period of time during which the navigation system 104 is turned on and operational, the dynamic RAM stores information that is written to it. Similarly, the processor 108 and/or GPU 120 may comprise an internal RAM, an internal ROM, a cache memory, and/or other internal non-transitory storage blocks, sections, or components that may be referred to in some contexts as non-transitory computer readable media or computer readable storage media.

For navigating the robot 100 in a designated environment, the navigation system 104 is configured to perform a method of navigating the robot 100 in the designated environment based on a scale plan of the designated environment. A scale plan of a designated or confined environment refers to a pre-existing map, plan or drawing drawn to scale and shows a layout of the designated environment. The layout is usually illustrated in plan view (i.e. view from the above) and includes at least certain information (e.g. fixed or immovable elements) of the environment, such as features of structures in an indoor environment, features of fixed regions/areas in an outdoor environment. For an indoor environment, a floor plan 132 (see FIG. 4) is a type of scale plan which illustrates the layout of a building, and the layout may include different layers to represent respective floors of the building. The floor plan 132 may include structural information of the floor (e.g. locations of permanent structures such as walls, windows, doors and stairs, and semi-permanent structures such as fixtures). For an outdoor environment, an area plan and a site plan are two types of scale plan, which may illustrate the boundaries and functions of certain areas in the outdoor environment. For example, Google map or OpenStreetMap are typical outdoor scale maps. For any target area or environment, regional outdoor scale plans may be extracted from such outdoor scale maps, such as, residential areas, school campus etc. Although a scale plan may not necessarily include precise measurement everywhere in an environment, and there may be discrepancies between scale plans and real environment, scale plans may be used as a top level guide for navigation in a designated environment.

Figure 3:
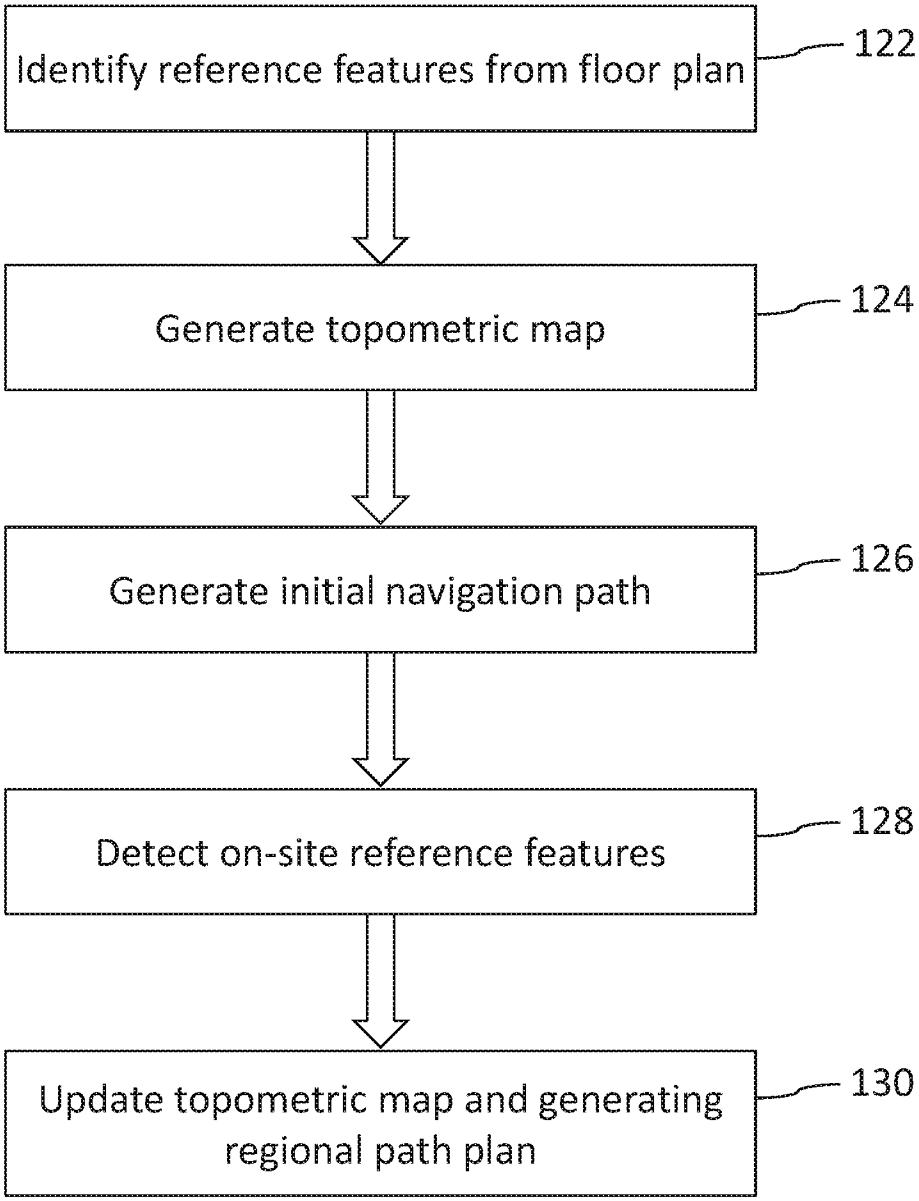
FIG. 3 illustrates a navigation method performed by the navigation system of FIG. 1.

FIG. 3 illustrates an exemplary method of navigating the robot 100 in the designated or confined environment and in this embodiment, the designated environment is a building (as an example of an indoor environment). The method based on the floor plan 132 of the building may be executed by the processor 108 and/or GPU 120 of the navigation system 104. The method may be performed in real time when the robot 100 is in motion to support navigation and control of the robot 100, comprising steps 122 to 130.

Figure 4:
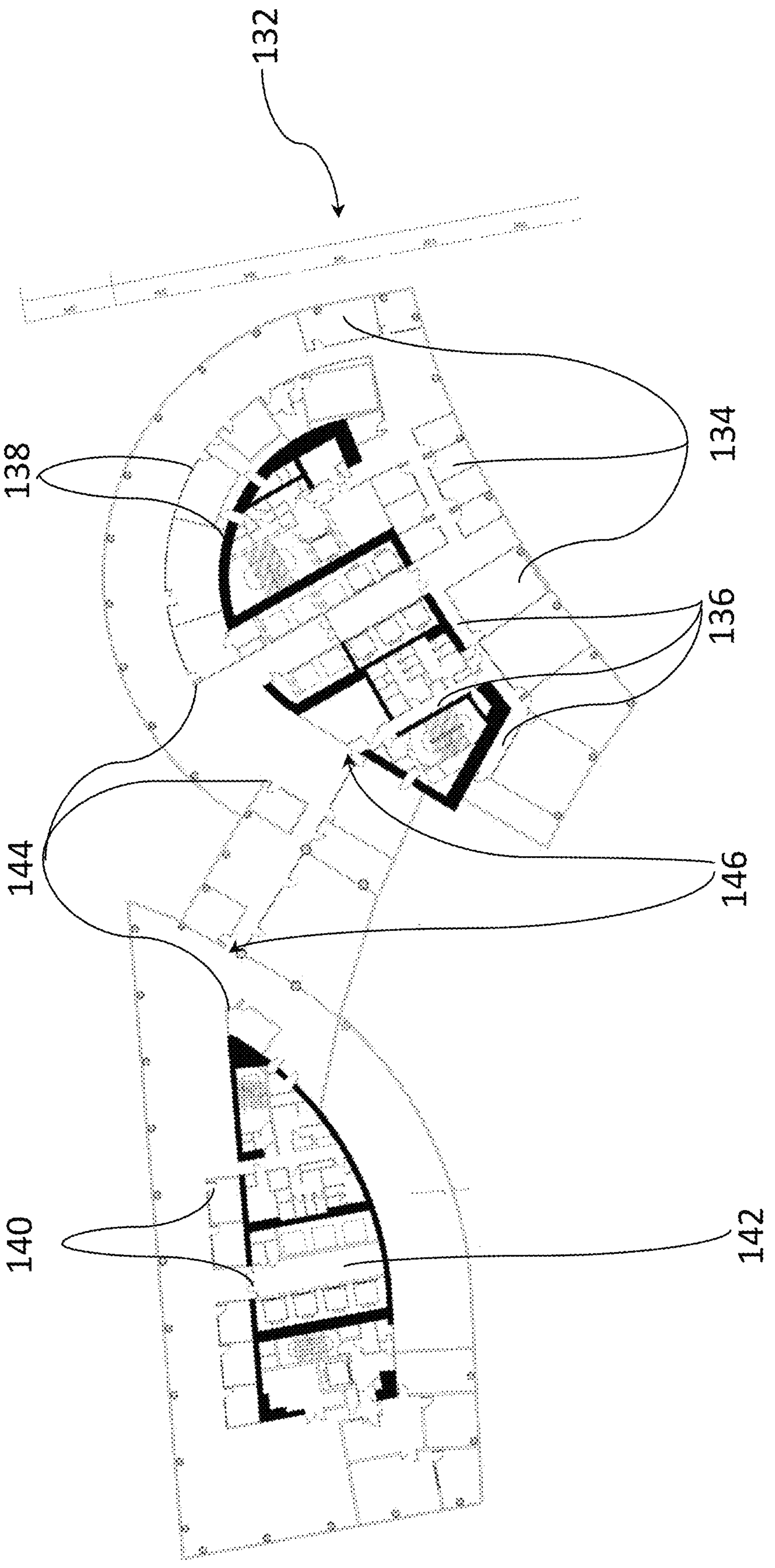
FIG. 4 illustrates a floor plan for use in the method of FIG. 3.

At step 122, the navigation system 104 selectively identifies reference features from the floor plan 132 of the building. FIG. 4 shows the flow plan 132 which explicitly illustrates or implies certain information (such as locations, shapes, area and functions) of a plurality of objects of the building, which may be extracted as reference features for subsequent use. Some typical reference features of the floor plan 132 as can be seen on FIG. 4 comprise location, shape and area of a plurality of rooms 134, location, area and direction of a plurality of corridors 136, location, thickness and direction of a plurality of walls 138, location, direction and size of a plurality of doors 140, location, size and area of a plurality of halls 142, location, angles and direction of a plurality of corners 144 corresponding to a plurality of junctions 146 etc. Table. 1 below illustrates reference features extracted in this embodiment. Row 1 of Table. 1 shows that information about the junctions 146 in the building is extracted from the floor plan 132. These junctions 146 are treated as key locations where the robot 100 is configured to make decisions (e.g. which direction to turn to) during navigation, and are presented as nodes 180 (see FIG. 8). Besides information about the junctions 146 extracted from the floor plan 132, metric information 190 may be detected using one or more sensors at these junctions 146. Row 2 of Table. 1 shows that connectivity of the junctions 146, representing free spaces 160 (see FIG. 6) linking the junctions 146, is also extracted from the floor plan 132 and presented as edges 186. The edges 186 linking nodes 180 include topological information of the building, and may be used for fast high level path planning and guiding a region level path planning. Although metric information 190 may be detected using one or more sensors at the free spaces 160 (including free spaces corresponding to the edges 186), the connectivity information extracted from the floor plan 132 at a topological level enables the initiation of the navigation and is relied on for navigation at the edges 186. Further, as shown in row 3 of Table. 1, semantic information is also extracted from the floor plan 132, i.e, functions of structures in the building. As different structures in the building may have different functions, such functions may be helpful during the navigation. The semantic information may be used to define reliability of information. In this embodiment, the reliability is defined as whether the structural information has low possibility to be affected by the environment. For example, the corridors 136 are reliable in terms of direction, the doors 140 are reliable in terms of visibility (location and direction) and the junctions 146 are reliable in terms of measurable structure. Typically, corridors are referred to as narrow pathways with walls on both sides, hence any path associated to such features is more reliable than others. Therefore, without further information, planning of a path will consider these locations with high priority.

TABLE 1

Reference features extracted from the floor plan

| S/N | Features | Definition | Information |
|---|---|---|---|
| 1 | Junctions 146 | Key locations to make decisions | Nodes 180 include metric information 190 |
| 2 | Connectivity | Free spaces 160 linking the junctions 146 | Edges 186 include topological info |
| 3 | Semantic info | Functionalities related to navigation | Reflects reliability of info |

Figure 5:
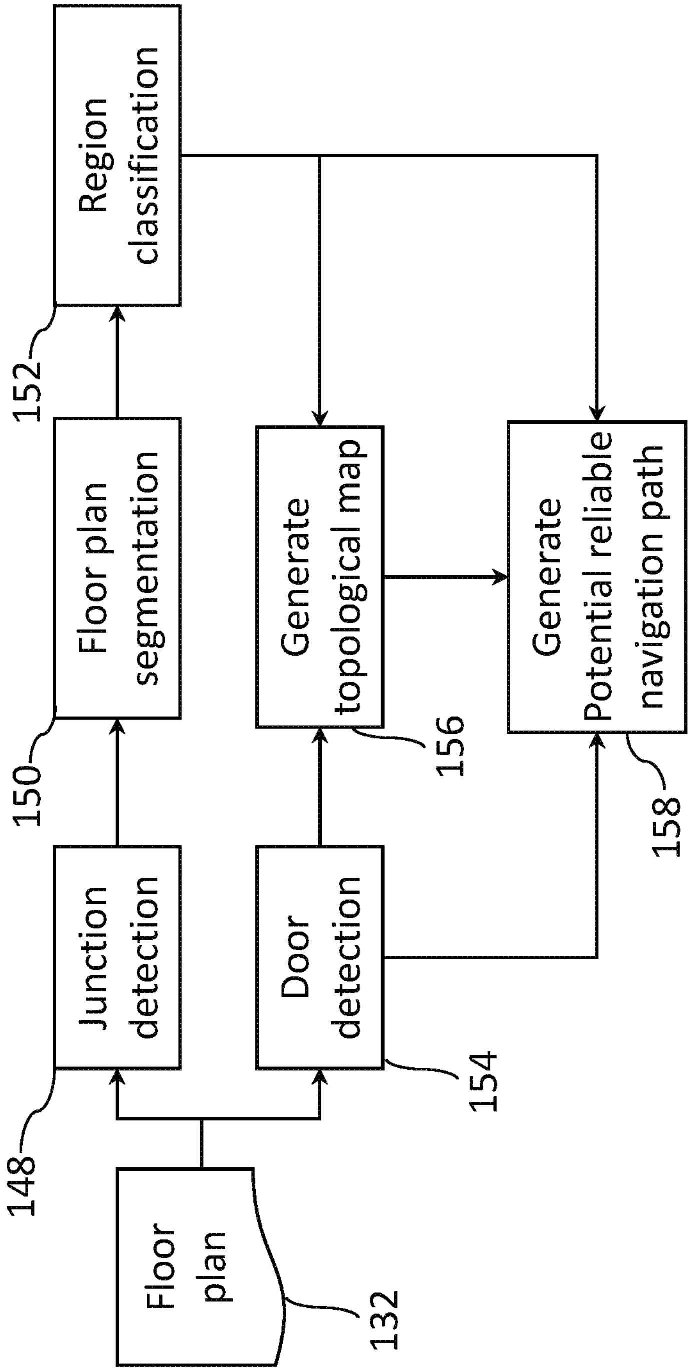
FIG. 5 illustrates a flow chart of floor plan analysis for the method of FIG. 3.
Figure 6:
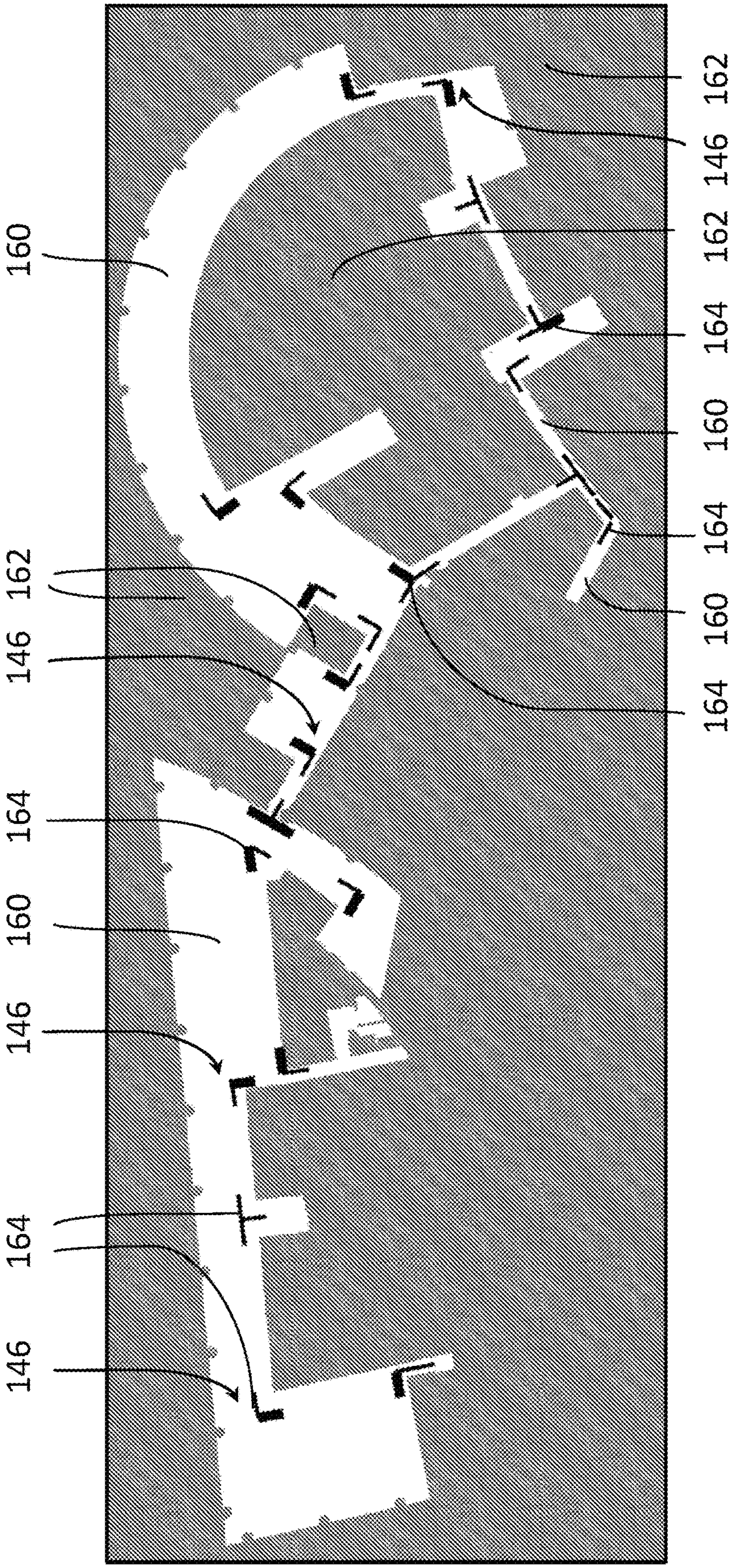
FIG. 6 illustrates an example of junctions identified by the floor plan analysis of FIG. 5.

For selectively identifying reference features shown in Table. 1 from the floor plan 132, the floor plan 132 is analysed by conducting floor plan analysis according to the flow chart illustrated in FIG. 5. The floor plan analysis comprises:

a) at step 148, detecting the plurality of junctions 146 from the floor plan 132 to be presented as nodes 180, by identifying the plurality of corners 144 based on minimum corner-to-wall distance. For detecting the plurality of corners 144 from the floor plan 132, the floor plan 132 is pre-processed to identify areas with the free spaces 160 that are potentially available for the robot 100 to traverse. FIG. 6 illustrates the identified corners 144 and illustrates the pre-processing result, showing the free spaces 160 in empty areas and the rest of areas of the floor plan 132 in shaded areas 162. Some corners 144 in the free spaces 160 are identified and presented in intersecting line segments 164. For each identified corner 144, thickness of the line segments 164 is used to represent the relative width of the free spaces 160 along different directions of the identified corner 144;

b) at step 150, segmenting the floor plan 132 into different regions, taking into consideration of the plurality of identified corners 144; in this embodiment, each enclosed polygon on the floor plan 132 is treated as a region and therefore be segmented accordingly.

c) at step 152, classifying the regions into different categories (such as workspace, room, corridor and junction), by identifying structures of the building (such as the rooms 134, the corridors 136, the walls 138, the doors 140 and the halls 142, in addition to the corners 144 detected at step a)); wherein some information is provided by the floor plan 132 such as the rooms 134, the walls 138 and the doors 140, while some information is detected or analysed from the floor plan 132, such as conducting topological analysis of the free spaces 160 on the floor plan 132 to detect the corridors 136 and the junctions 146;

d) at step 154, detecting locations of the plurality of doors 140;

e) at step 156, generating a topological map 182, using information of the free spaces 160 to find path between nodes 180;

f) at step 158, identifying a potential navigation path 166 (see FIG. 7) by associating the path between nodes 180 to reference features (such as the identified free spaces 160, the identified junctions 146, the identified nodes 180, the separated regions, the identified structures of the building, the categories of regions and locations of the identified doors 140). Identifying the potential navigation path by taking into consideration of the reference features helps to improve the reliability of the identified potential navigation path 166.

Figure 7:
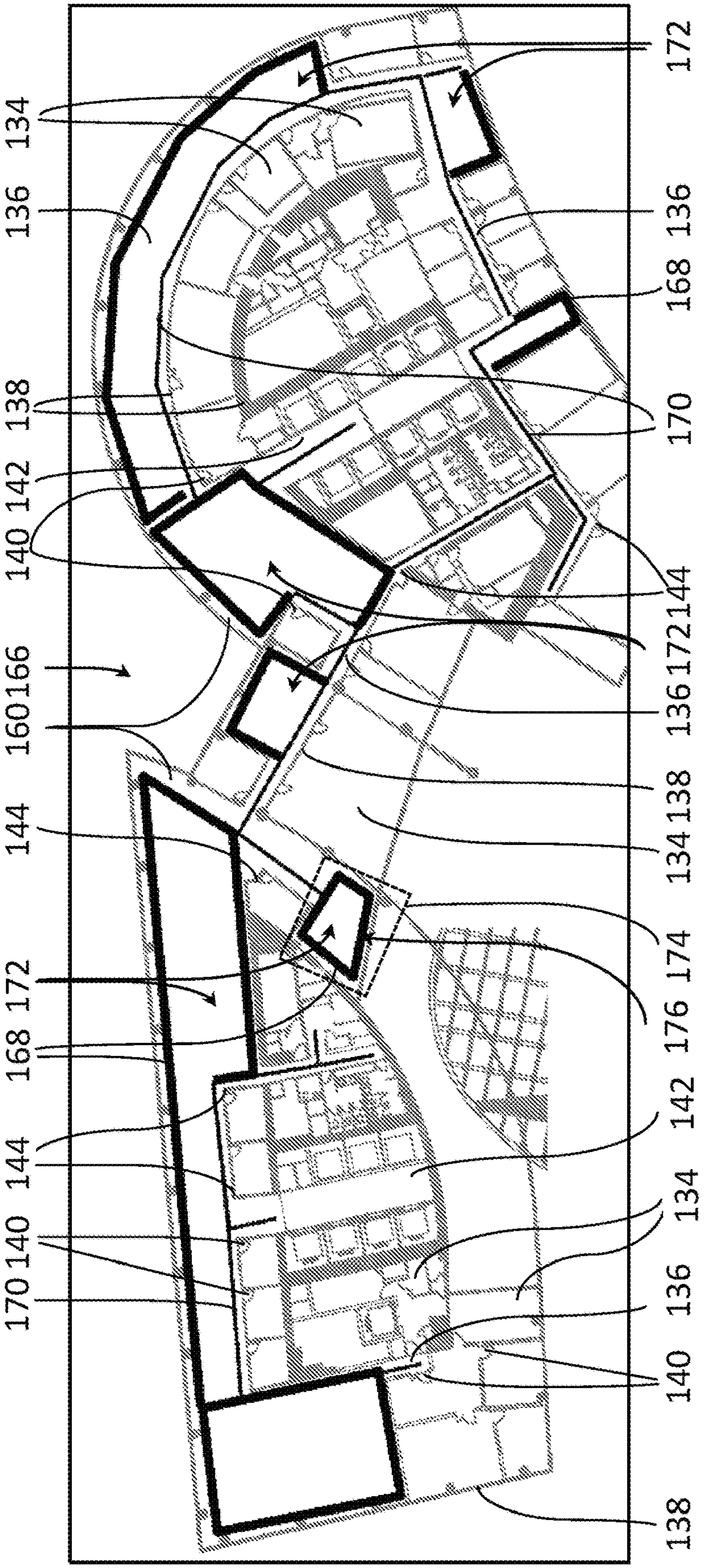
FIG. 7 illustrates an example of a potential navigation path identified by the floor plan analysis of FIG. 5.

FIG. 7 illustrates the identified potential navigation path 166 which are associated to the narrow corridors 136 and the doors 140 on the floor plan 132 of the building. FIG. 7 illustrates bolded lines 168 and un-bolded lines 170. The bolded lines 168 and un-bolded lines 170 are used to generate the potential navigation path 166. When a portion of the potential navigation path 166 is from the corridors 136 or close to semantic features (such as doors 140 which are unlikely be occluded), such portion is illustrated using un-bolded lines 170. Bolded lines 168 and un-bolded lines 170 segment the whole spaces into different regions 172. The regions 172 enclosed by the bolded lines 168 and/or the un-bolded lines 170 are the parts of the free spaces 160 on the floor plan 132 that have high chance to be partially occupied (indicating high discrepancy) by furniture or other stuff in real environment. Areas before the plurality of doors 140 and the plurality of corridors 136 are hardly to be blocked. If such areas are blocked, the blockage is easy to be detected since no free space is available.

Returning to FIG. 3 at step 124, the navigation system 104 generates the topometric map 178 of the building which is associated with the identified reference features. A topometric map is a map that may comprise topological information from a topological map and metric information detected from an environment. The potential navigation path 166 is used for generating the topometric map 178. For the local region 174, the bolded lines 168 within the local region 174 are used to generate the initial navigation path 176 of the local region 174. As the topometric map 178 comprises a navigation path in the beginning, the robot 100 is able to start traveling based on such navigation path.

Figure 8:
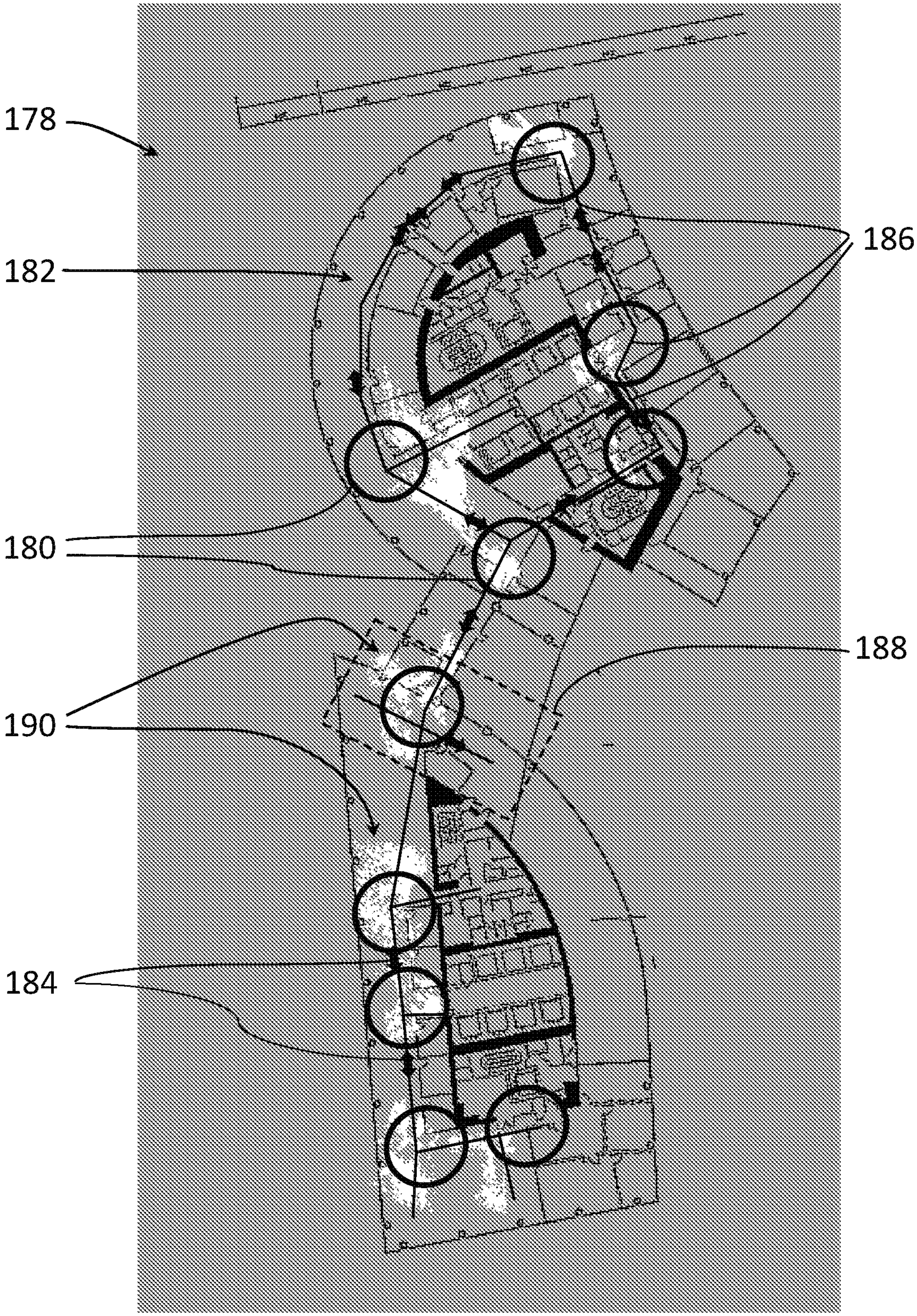
FIG. 8 illustrates a topometric map generated by the method of FIG. 3.

FIG. 8 illustrates the topometric map 178 evolved from FIG. 7. The topometric map 178 being associated with various reference features of the building, mainly comprises three components: the nodes 180, the topological map 182 and orientation guided landmarks 184:

Nodes: Nodes 180 represent sparse key locations where the robot 100 is able to detect using the sensor module 102 and/or to determine a direction for traversing. These key locations are relatively stable, and initially may be obtained from the floor plan 132 according to structural information of the building, such as the doors 140, the junctions 146 and centres of the rooms 134. With the traverse of the robot 100 in the building, these key locations will be updated according to capabilities of the sensor module 102 of the robot 100. The metric information 190 at the nodes 180 provide a basis for visual localization and assist the robot 100 to recognise its location. The nodes 180 serve as key components to provide metric information 190 so that at these places, the robot 100 is able to recover or correct its pose, reduce drifting of and/or re-initialize its pose.

Topological map: Multi paths coexist among the nodes 180, which illustrate relative connectivity among the nodes 180. Topological map 182 comprises nodes 180 at key locations and edges 186 demonstrating relative connectivity among the nodes 180. The connectivity includes the potential navigation path 166 associated to specified elements in the building. The topological map 182 will be used for fast high level path planning for the whole of the building and for guiding the region level path planning, and providing direction guide especially when the robot 100 is traversing at the edges 186.

Orientation guided landmarks: Orientation guided landmarks 184 encode useful information from the environment to guide the robot 100 to do directional navigation, it could be obtained from structural constraints or generated on the fly. The orientation guided landmarks 184 help to identify what information is useful to help the navigation in addition to the above-mentioned nodes 180 and edges 186. For example, based on the floor plan 132, a corridor 136 (especially when with a narrow space) is one of such features since the only path between two nodes 180 has the same direction as the parallel walls 138. A door 140 is another one of such features that may be used to derive orientation guided landmarks 184; the orientation guided landmarks 184 shown in FIG. 8 are illustrated in bi-direction arrows 184 which show the directions derived from the doors 140 beside the edges 186. Such semantic information may be added into or associated to the topometric map 178 to be used to guide the robot 100 during traversing. The orientation guided landmarks 184 may be obtained from floor plan analysis or on-site detection of reference features.

structures of the building which will be updated upon change detected, and vision based landmarks such as images taken during navigation from the current location 192 towards the target location which will be updated when visiting the landmarks 184.

Returning to FIG. 3 at step 126, the navigation system 104 generates the initial navigation path 176 of the local region 174 from the topometric map 178. The initial navigation path 176 of the local region 174 where the robot 100 locates enables the robot 100 to start traversing in the local region 174 of the building.

At step 128, as the robot 100 navigates along the initial navigation path 176 of the local region 174, the sensor module 102 of the robot 100 detects on-site reference features of the local region 174 that correspond to the identified reference features of the floor plan 132.

At step 130, the navigation system 104 updates the topometric map 178 based on the correspondence to generate the regional path plan 188 to guide the direction of the robot 100 in the local region 174.

TABLE 2

Components, functionality, source and frequency of update of the topometric map

| S/N | Components | Functionality | Source and frequency of update |
|---|---|---|---|
| 1 | Topological map 182 | Nodes 180: key locations to make decision<br>Edges 186: Connectivity | Obtained from floor plan analysis<br>Most stable after verification and will be updated upon change detected |
| 2 | Metric information 190 of building on nodes 180 | Re-initialization, drift reduction, lost recovery | Structure nodes 180 are obtained by sensor detection, and vision nodes 180 (e.g. spaces in the rooms 134) are obtained by Structure from Motion (SFM) from indoor panoramic image<br>Metric information 190 will be updated when visiting the nodes 180 |
| 3 | Orientation guided landmarks 184 | Local reference frame to assist select next waypoint | Structure based landmarks 184 are stable features, e.g. the corridors 136, the walls 138, the corners 144, and will be updated upon change detected<br>Vision based landmarks 184 are based on images obtained on the fly, e.g. images taken during navigation from a current location 192 (see FIG. 9) towards a target location, and will be updated when visiting the landmarks 184 |

Figure 9:
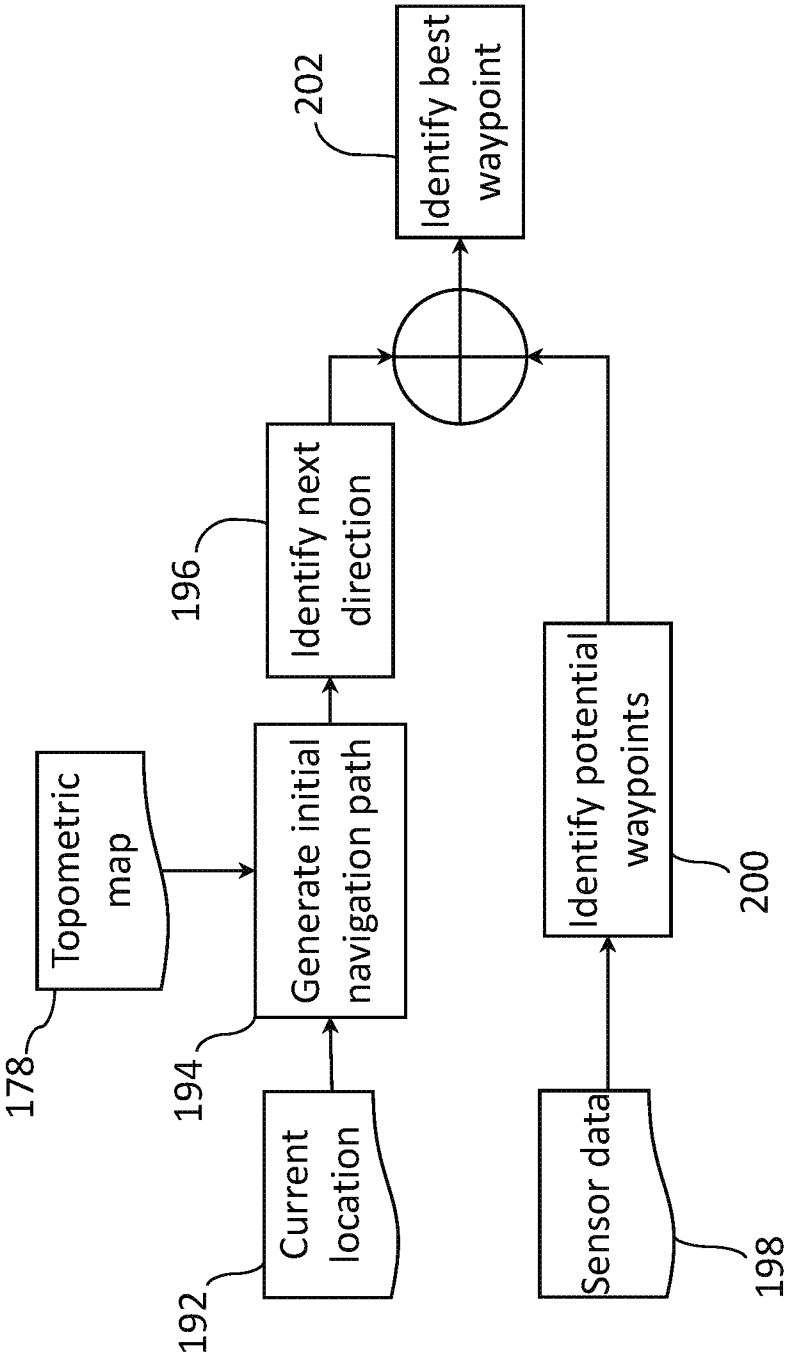
FIG. 9 illustrates a flow chart of regional path planning based on the topometric map of FIG. 8.

As shown in row 1 of Table. 2, the nodes 180 correspond to those key locations that the robot 100 makes decision and the edges 186 represent connectivity of the nodes 180, which are obtained from the floor plan 132 and are the most stable information and only require update if a change is detected. Turn to row 2 of Table. 2, at a node 180, the sensor module 102 of the robot 100 detects reference features of the building at the node 180 surrounding the robot 100, which comprises metric information 190 and can be used for re-initializing the robot 100, reducing drift and recovering lost. Reference features detected by the sensor module 102 in the building reflect a real environment of the region, comprising information about permanent structures, semi-permanent structures and movable objects, and are relative stable. Such detected reference features may be updated when the robot 100 is visiting the node 180. Row 3 of Table. 2 relates to the orientation guided landmarks 184. As there could be multiple potential waypoints for the robot 100 to move towards at the local region 174, the orientation guided landmarks 184 may be used to as a local reference frame to assist in selecting a next waypoint. The orientation guided landmarks 184 comprise structure based landmarks relating to features such as permanent structures and semi-permanent FIG. 9 illustrates a flow chart of regional path planning which helps to direct the robot 100 to traverse from one region to a neighbouring region based on the topometric map 178 and sensor data 198. The current location 192 of the robot 100 may be identified using any existing method known in the field. At step 194, the topometric map 178 is used as a high level path planner to generate the initial navigation path 176 for the local region 174. At step 196, based on the current location 192 and the initial navigation path 176, appropriate one or more orientation guided landmarks 184 is/are selected for navigating the robot 100 in a direction to a next location, i.e. identifying a next direction. On the other hand, the sensor module 102 of the robot 100 detects environment of the local region 174 when the robot 100 is traversing and provides the sensor data 198. The sensor data 198 may be used for forming a low-level local map which is a map from the readings of the sensor module 102 when the robot 100 is traversing (an observation of the real world, i.e. the environment of the local region 174 in this example). At step 200, the local map based on the sensor data 160 when the robot 100 is traversing, reflecting local reference features, is used to identify potential waypoints. The local reference features are detected on-site using the sensor module 102, comprising local structural features (e.g. the corners 144) and/or learnt visual features. The local structural features are detected using one or more sensors which are able to detect depth; the learnt visual features are detected using visual sensors. At step 202, taking into consideration of both the next direction determined at step 196 and the potential waypoints identified at step 200, a best waypoint is identified for controlling the traverse of the robot 100 to the neighbouring region via the identified best waypoint. As an intermediate layer path planning, the regional path planning bridges high-level topological map-based path planning and low-level local map based on the sensors.

For updating the topometric map 178, reference features that are useful for navigation from the readings of the sensor module 102 are identified and associated to the topometric map 178. The reference features may include more than the structural information, such as visual features and semantic information. With more and more updates based on the detected information of the real world environment, the topometric map 178 would become more and more helpful in navigation.

Figure 10:
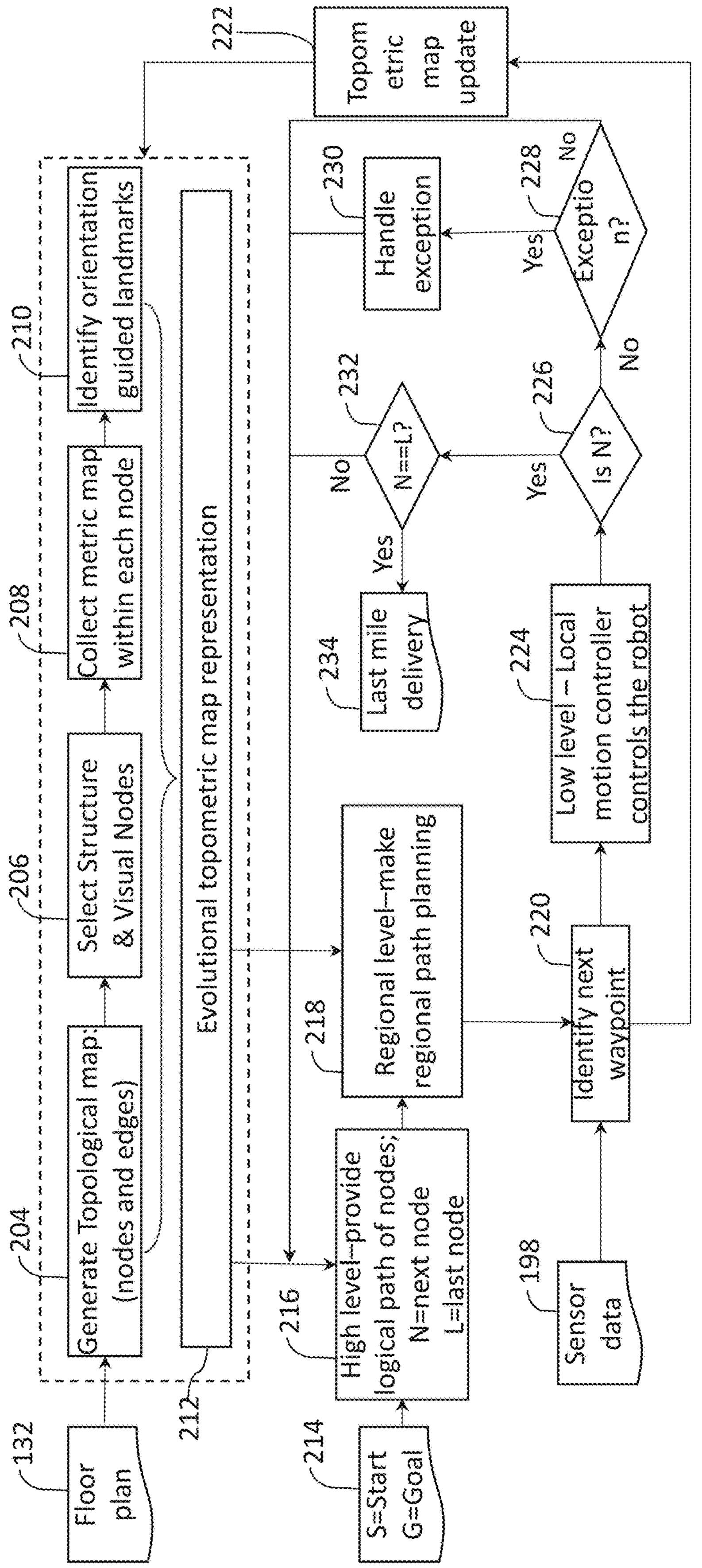
FIG. 10 illustrates a flow chart of an application of the method of FIG. 3.

Overall, the information obtained from the floor plan 132 provides a basis for the robot 100 to start travelling in the building, and for evolution of the topometric map 178 with on-site detected information. For exemplary purpose, FIG. 10 illustrates a flow chart of an application of the method in navigating the robot 100 based on the floor plan 132 of the building, with the sensor module 102 of the robot 100 comprising a RGB & Depth sensor (RGB-D sensor). The robot 100 receives the floor plan 132 as a basis for the subsequent processing. At step 204, analysis is performed on the floor plan 132 to identify reference features including the nodes 180, the edges 186 and the orientation guided landmarks 184 wherein the nodes 180 and the edges 186 are used to generate the topological map 182. At step 206, structure nodes 180 and visual nodes 180 (if available) are selected for subsequent use. A node 180 is selected to be used as a structure node 180 if structural feature(s) of such node 180 from the floorplan 132 and from the sensor module 102 are matched. At locations around selected structure nodes 180 and/or recognized landmarks (e.g. doors 140), visual features are generated. Visual nodes 180 are identified if visual features at selected structure nodes 180 and/or recognized landmarks are rich enough to perform localization (e.g. sufficient for generating 3D point cloud from structure from motion (SFM)). At step 208, metric map for each node 180 is collected. At step 210, the orientation guided landmarks 184 are identified. At step 212, the topological map 182, the selected nodes 180, the metric map collected within each node 180 and the orientation guided landmarks 184 are used to generate the topometric map 178, which is in an evolutional representation. The topometric map 178 serves as a high level plan to generate an initial global path plan comprising initial navigation paths 176 covering different local regions of the building. The topometric map 178 is evolutional with information received subsequently.

After the start and goal locations 214 are confirmed, the navigation starts with the initial global path plan. At step 216, the initial global path plan generated from the topometric map 178 is used to provide a logical path of nodes 180, which is used to guide the robot 100 to navigate from one node 180 to another. At step 218, the logical path of nodes 180 and the orientation guided landmarks 184 in the local region 174 are used to make a regional path planning, e.g. the initial navigation path 176. At step 220, the sensor data 198 from the RGB-D sensor of the robot 100 comprising on-site detected reference features (e.g. structural information, potential waypoints, the orientation guided landmarks 184 in the environment surrounding the robot 100) of the local region 174 and the regional path planning from step 218 are used to identify the next waypoint. Images from the RGB-D sensor are collected and are used to perform 3D reconstruction by SFM. The 3D reconstruction is then used to recognize the nodes 180 besides the structure information from depth. The regional path plan 188 is generated taking into consideration of reference features of the local region 174 and the initial navigation path 176 of the local region 174 to provide directional information to the robot 100 in the local region 174. The next waypoint is identified to guide the robot 100 to travel to a next node 180 according to the logical path of nodes 180. At step 222, the detected reference features are used to update the topometric map 178 for the local region 174, by associating the on-site detected reference features in the local region 174 with the corresponding node 180 in the topometric map 178.

At step 224, a local motion controller without collision is used to control motion of the robot 100 based on the identified next waypoint. At step 226, the local motion controller determines whether there is a next node 180. Where there is no next node 180, step 228 is carried out to determine whether an exception occurs. In this embodiment, the robot 100 is always expected to reach a next node 180 in a predetermined time window, so that if the robot 100 does not reach the next node 180 within the time constraint, the exception will be triggered. If the exception is triggered, step 230 is carried out for the local motion controller to handle the exception to relocate the robot 100 based on information of the structure nodes 180 and/or the visual nodes 180 and thereafter control the robot 100 to travel to the next node 180 based on the logical path of nodes 180; if the exception is not triggered, the local motion controller controls the robot 100 to travel to the next node 180 based on the logical path of nodes 180. Where the local motion controller determines that there is next node 180 at step 226, step 232 is carried out for the local motion controller to control the robot 100 to travel to the next node 180 based on the logical path of nodes 180 if the next node 180 is not the last node 180; or, the local motion controller controls the robot 100 to complete the last mile delivery 234, whereupon the navigation is completed.

As described above, the generation of the regional path plan 188 bridges the high-level topological map 182 based path planning and low-level local map from sensor; at the local region 174, localization based on the regional path plan 188 may be accurate enough to perform regional path planning. An example to demonstrate the advantages of the regional path plan 188 is: when the robot 100 is on a corridor 136, the exact location of the robot 100 between an entrance and an exit of the corridor 136 is not so important; as long as the corridor direction is detected, the robot 100 is able to move toward the exit; and as long as the exit can be correctly detected, the robot 100 is able to make another node-to-node navigation. Therefore, using the regional path plan 188 as the bridge lowers the requirement of precise localization (e.g. accurate localization on the global topometric map 178) by finding the direction and rough localization during the robot navigation, so that the robot 100 can put more efforts in making low level motion controlling (such as focusing on moving the robot 100 on the local scanning map) rather than global path planning. As the regional path plan 188 mainly uses the direction information, the estimation of the exact location of the robot 100 on the topometric map 178 could be large so that navigation may be improved if accumulated errors are reduced or eliminated before reaching a remarkable level. Accumulated errors may be reduced or eliminated by correcting pose of the robot 100 when it reaches an area where reference feature or metric information 190 is available, such as at the structure nodes 180 or the visual nodes 180.

For ease of review, Table. 3 provides a brief illustration on the advantages of each level of path planning. For the high level planning in row 1 of Table. 3, as it is based on nodes 180 from the topological map 182, no sensor data 198 is involved in the computation, this planning is efficient. For the low level of the sensor data 198 of the environment as shown in row 3 of Table. 3, as no global map is involved, this level of planning is tolerant to localization errors. Row 2 of Table. 3 shows that the regional level that bridges the high level and low level does not require precise location as it is guided by associating information from the high level planning and low level planning at the local region 174.

TABLE 3

Advantages of different levels of path planning

| S/N | Level of path planner | Functionality on | Advantages |
|---|---|---|---|
| 1 | High level | Nodes 180 to nodes 180 | No sensor data 198 involved, efficient. |
| 2 | Regional level | Link high level & low level | No precise location required, orientation guided. |
| 3 | Low level | Sensor data 198 | No global map involved, tolerant to localization errors. |

With the system and method disclosed in the described embodiment, the navigation does not require precise localization everywhere and the robot 100 may start navigation with only a scale plan even when precise measurement is not available at the beginning. Therefore, the robot 100 may be deployed in the designated environment at a faster speed with a lower computational cost, particularly when it is a new environment to the robot 100. Further, the metric information from detection of on-site reference features may be used to correct pose of the robot 100, by performing the correction periodically, strict requirement of precise localization is also reduced. Consequently, requirement on storage and precise localization computation cost are minimised.

Further, the topometric map 178 may carry sufficient information for robot navigation yet maintains the concise representation of the map. As the topometric map 178 is evolutional and may be updated with reference features of the real environment detected by the sensor module 102, the robot 100 would become more and more 'familiar' with the environment as the sensor module 102 may repeatedly provide useful information about the real environment to update the topometric map 178 if there are repeated visits of the same environment over time, hence the topometric map 178 will become more and more helpful in navigation with repeated visits over time.

While steps of the method in the described embodiment is performed continuously, it is envisaged that different steps may be performed separately. For example, the floor plan analysis may be performed before the robot 100 is deployed and the analysis results may be stored for subsequent use. As another example, the floor plan analysis may be performed by another party so that the robot 100 only receives the results of the floor plan analysis for navigation.

While it is mentioned in the described embodiment that the robot 100 has wheels, it is envisaged that the robot 100 may be of any type that is able to move around, such as a robot equipped with legs, wings, propellers and/or balloon. It is also envisaged that one type of the robot 100 equipped with wheels is an autonomous vehicle (AV).

While the designated environment in the described embodiment is a building, it is envisaged that the method and system may be applied to outdoor scenarios as well, such as outdoor AVs and mobile platform applications. With the orientation guided process together with junction detection process described, the topometric map 178 may be applied to drive the AVs without precise localization everywhere, which may reduce the computation load so that the AVs may focus more on local motion rather than global localization, and it is more tolerant to localization errors. For example, for AVs on a highway, the most important thing is when to make a decision such as selecting road on junction or exit, so that at other locations the AVs only need to follow the direction along the way.

While the sensor module 102 in the above described embodiment comprises a RGB-D sensor, it is envisaged that the sensor module 102 may comprise other sensors that may help to detect reference features of an environment, such as a LiDAR sensor, a RADAR sensor, an ultrasonic sensor, etc.

While in the described embodiment, nodes 180 representing key locations are obtained according to structural information, it is envisaged that, where an open space is big and there is not enough structural information to help inserting nodes 180, virtual nodes 180 may be inserted so that when the robot 100 is within the vicinity or nearby, visual information can be collected to generate a visual node 180.

While the topometric map 178 in the described embodiment comprises nodes 180, edges 186 and orientation guided landmarks 184, it is envisaged that the topometric map 178 may comprise a different combination of types of reference features or a different type of representation or components.

While in the described embodiment, each enclosed polygon on the floor plan 132 is treated as a region, it is envisaged that, for big polygons, each polygon may be divided into two or more regions.

While FIG. 8 illustrates a regional path plan 188 that covers one node 180 and some edges 186, it is envisaged that a regional path plan 188 may cover other number of nodes 180 and edges 186. For example, a regional path plan 188 may comprise two nodes 180 and an edge 186 connecting the two nodes 180.

While in the described application example, exception is handled by the local motion controller, it is envisaged that it may be handled by other controllers.

While the navigation system 104 is shown as a separate module in FIG. 1, it is envisaged that it may form part of the controller 106.

In the described embodiment, the plurality of junctions 146 is detected from the floor plan 132 based on minimum corner-to-wall distance, it is envisaged that other appropriate methods may be used for the detection.

Having now described the invention, it should be apparent to one of ordinary skill in the art that many modifications can be made hereto without departing from the scope as claimed.

The invention claimed is:

1. A method of navigating a robot in a designated environment, the robot comprising a controller configured to control movement of the robot, a sensor module configured to detect on-site reference features and a processor, comprising:

(i) selectively identifying, by the processor, reference features from a scale plan of the designated environment, wherein the reference features comprise a plurality of free spaces identified from the scale plan that are potentially available for the robot to traverse in the designated environment;

(ii) generating, by the processor, a topometric map of the designated environment, the topometric map being associated with the identified reference features, wherein generating the topometric map comprises generating a topological map by using the plurality of identified free spaces to find a path between any neighbouring two of a plurality of local regions of the designated environment;

(iii) generating, by the processor, a potential navigation path from the topometric map, by associating the topological map to the identified reference features;

(iv) as the robot navigates along the potential navigation path, detecting, by the sensor module, on-site reference features of each local region that correspond to the identified reference features of the scale plan;

(v) updating, by the processor, the topometric map based on the correspondence to generate a regional path plan to guide the robot's direction in each local region; and (vi) controlling, by the processor, the controller to cause movement of the robot according to the regional path plan.

2. The method according to claim 1, further comprising, at the path between neighbouring two of the plurality of local regions, navigating the robot is based on the generated topological map or the generated potential navigation path.

3. The method according to claim 1, further comprising:

detecting, by the sensor module, on-site reference features of each of the plurality of local regions that correspond to the identified reference features of the scale plan as the robot navigates along the potential navigation path in the corresponding local region, and/or updating the topometric map for each of the plurality of local regions.

4. The method according to claim 1, wherein the designated environment is an indoor environment of a building and the scale plan is a floor plan of the building, wherein the reference features comprise a plurality of junctions identified from the floor plan, and the method further comprises segmenting the floor plan into a plurality of regions based on the plurality of identified junctions.

5. The method according to claim 4, wherein the reference features further comprise:

categories of the plurality of segmented regions, and the method further comprises determining, by the processor, the categories of the plurality of segmented regions by identifying a plurality of structures of the building from the floor plan, and/or locations and directions of a plurality of doors identified from the floor plan.

6. The method according to claim 1, wherein the reference features comprise a plurality of nodes; and wherein the potential navigation path comprises a logical path of the plurality of nodes; and wherein the method further comprises:

identifying one or more structure nodes from the plurality of nodes, wherein each structure node has a structural feature that is matched between the selectively identified reference features and the detected on-site reference features.

7. The method according to claim 6, further comprises:

relocating the robot based on information of the one or more structure nodes, if the robot does not reach a next node based on the logical path within a time constraint.

8. The method according to claim 7, further comprises:

controlling the robot to travel to the next node based on the logical path, after relocating the robot.

9. A system for navigating a robot in a designated environment, comprising:

i. a sensor module, configured to detect on-site reference features;

ii. a controller configured to control movement of the robot; and iii. a processor, configured to:

a) selectively identify reference features from a scale plan of the designated environment, wherein the reference features comprise a plurality of free spaces identified from the scale plan that are potentially available for the robot to traverse in the designated environment;

b) generate a topometric map of the designated environment, the topometric map being associated with the identified reference features, wherein in order to generate the topometric map, the processor is further configured to generate a topological map by using the plurality of identified free spaces to find a path between any neighbouring two of a plurality of local regions of the designated environment;

c) generate a potential navigation path from the topometric map by associating the topological map to the identified reference features;

d) receive on-site reference features of each local region that correspond to the identified reference features of the scale plan from the sensor module as the robot navigates along the potential navigation path;

e) update the topometric map based on the correspondence to generate a regional path plan to guide the robot's direction in each local region; and f) control the controller to cause movement of the robot according to the regional path plan.

10. The system according to claim 9, wherein, at the path between the neighbouring two of the plurality of local regions, the processor is further configured to navigate the robot based on the generated topological map or the generated potential navigation path.

11. The system according to claim 9, wherein the sensor module is configured to detect on-site reference features of each of the plurality of local regions that correspond to the identified reference features of the scale plan as the robot navigates along the potential navigation path in the corresponding local region.

12. The system according to claim 9, wherein the processor is configured to update the topometric map for each of the plurality of local regions.

13. The system according claim 9, wherein the designated environment is an indoor environment of a building and the scale plan is a floor plan of the building, wherein the reference features comprise a plurality of junctions identified from the floor plan, and the processor is further configured to segment the floor plan into a plurality of regions based on the plurality of identified junctions.

14. The system according to claim 13, wherein the reference features further comprise:

categories of the plurality of segmented regions, and the processor is further configured to identify a plurality of structures of the building from the floor plan to determine the categories of the plurality of segmented regions, and/or locations and directions of a plurality of doors identified from the floor plan.

15. A robot, comprising:

(i) a system according to claim 9; and (ii) a controller configured to control an operation of the robot in a designated environment based on a direction received from the system.

16. The system according to claim 9, wherein the reference features comprise a plurality of nodes;

wherein the potential navigation path comprises a logical path of the plurality of nodes; and wherein the processor is further configured to:

identify one or more structure nodes from the plurality of nodes, wherein each structure node has a structural feature that is matched between the selectively identified reference features and the detected on-site reference features.

17. The system according to claim 16, wherein the processor is further configured to:

relocate the robot based on information of the one or more structure nodes, if the robot does not reach a next node based on the logical path within a time constraint.

18. The system according to claim 17, wherein the processor is further configured to:

control the robot to travel to the next node based on the logical path, after relocating the robot.

* * * * *